United States Patent [19]

Kishibata et al.

[11] Patent Number: 4,834,299
[45] Date of Patent: May 30, 1989

[54] FLUIDIZED-BED GRANULATING APPARATUS

[75] Inventors: Kazuo Kishibata, Shimada; Naozi Sawaguchi, Kikugawa, both of Japan

[73] Assignees: Kaisha Okawara Seisakusho, Shizuoka; Freund Industrial Co., Ltd., Tokyo, both of Japan

[21] Appl. No.: 104,753

[22] Filed: Oct. 5, 1987

[51] Int. Cl.$^4$ .............................................. B02C 19/00
[52] U.S. Cl. ......................................... 241/5; 241/39; 241/57; 427/213
[58] Field of Search ................ 366/102, 107; 110/245; 427/213; 241/57, 69, 5, 39, 1, 101.7

[56] References Cited

U.S. PATENT DOCUMENTS 4,623,098 11/1986 Motoyama et al. .............. 241/57 X

Primary Examiner—Mark Rosenbaum
Attorney, Agent, or Firm—Kane, Dalsimer, Sullivan, Kurucz, Levy, Eisele and Richard

[57] ABSTRACT

A fluidized-bed granulating apparatus which granulates powdered or granular raw materials by centrifugally tumbling and fluidizing them on a rotor rotating in a container and by supplying a gas from a lower portion of the container. The container and the rotor are supported by a horizontally movable wagon, are vertically and movably supported by a lift-up device, and can be attached to and separated from the lower portion of a body of the fluidized-bed granulating apparatus. The rotor is rotated by a motor provided outside the granulating apparatus, and the driving force of the motor is transmitted from the output shaft thereof to the rotor through a universal joint, a transmission shaft, and a reduction gear. When the container and the rotor are attached to and separated from the lower portion of the body of the graulating apparatus, the universal joint is similarly attached to and separated from the transmission shaft.

8 Claims, 3 Drawing Sheets

FLUIDIZED-BED GRANULATING APPARATUS

BACKGROUND OF THE INVENTION

1. Field of the Invention

The present invention relates to a technique of fluidized-bed granulation, and more particularly, to a technique of granulating substances to be processed by subjecting the substances to a tumbling and fluidizing action by a gas introduced into a processing vessel and a rotor rotating in the processing vessel.

2. Related Art Statement

A fluidized-bed granulating apparatus, for example, that shown in FIG. 3, comprises inlet filters 1, a steam heater 2, a wind chamber 3, a lift-up device 4, a wagon 5, a wire mesh 6, a container 7, a spraying chamber 8, a spray nozzle 9, bag filters 10, a shaking device 11, a shaking cylinder 12, a damper 13 for stopping ventilation, and a cylinder 14 for stopping ventilation. However, it is difficult to obtain product having high bulk density with this sort of apparatus because powdered or granular substances in the container are subjected to a fluidizing action only by the gas from the wind chamber 3.

Therefore, in order to solve this problem, a method employing a fluidized bed with rotor disk to obtain spherical and hard product having high bulk density has been known, and an apparatus of this type has been used actually. In such an apparatus, however, a circular slit which is formed between the inner wall of the container and the periphery of the rotor can be closed by, for example, a seal provided around the periphery of the rotor or a vertically movable seal ring provided under this circular slit, so that raw materials do not fall under the rotor from the circular slit when the damper is fully closed to stop ventilation temporarily for the purpose of facilitating the shaking off dust from the bag filters.

In the above-described structure, however, the container or the seal ring is brought into contact with the rotor or the seal, and the rotation of the rotor must therefore be stopped temporarily. Therefore, the effect of the centrifugal tumbling action of the rotor is reduced by half.

In order to prevent the raw materials from falling from the rotor through this slit, it has been proposed to provide the apparatus with a pulse jet cleaning device which does not necessitate the stopping of ventilation temporarily during the removal of dust, or the bag filters are divided into two chambers and a mechanism providing alternate shaking is provided. Since this apparatus is always ventilated, the slit need not to be fully closed. Therefore, the rotation of the rotor need not be stopped, but there is a disadvantage in that the raw materials are not readily subjected to the tumbling action of the rotor because they are always in a fluid state.

Therefore, if an intensive tumbling action is expected from rotating of the rotor, a method could be conceived in which no ventilating portion is provided in the rotor, and the rotor serves as a blind so that only the slit is ventilated and the raw materials are not fluidized but are made to tumble on the rotor. The inventors have found that this method has disadvantages in that, since the amount of hot air used is small and the speed of drying is low, the spraying of a given amount of a binder requires a long time, lumps are produced during the granulation, owing to excess of water in the raw materials, and drying requires another drying machine.

SUMMARY OF THE INVENTION

In consideration of the above-described problems, it is an object of the present invention to provide a technique of fluidized-bed granulation which is capable of obtaining spherical and hard product having high bulk density.

It is another object of the present invention to provide a technique of fluidized-bed granulation which is capable of reducing the granulating time.

It is a further object of the present invention to provide a fluidized-bed granulating apparatus which is capable of obtaining spherical and hard product having high bulk density, by simply changing the container of a conventional fluidized-bed granulating apparatus.

In order to solve the above-described problems, a fluidized-bed granulating apparatus of the present invention comprises a removable container which is provided under a processing chamber, a rotor which rotates within the container, a rotor-driving means, a gas-introducing means for introducing a gas into the container through a circular slit between the inner wall of the container and the periphery of the rotor, an air-permeable sealing means which is provided under the circular slit, a labyrinth means for partitioning the space between the air-permeable sealing means and the rotor, and a product discharging means for discharging products from the container to the outside.

The above-described apparatus of the present invention can obtain spherical and hard product having high bulk density, simply by changing the container of a conventional fluidized-bed granulating apparatus.

The above-described and other objects and advantages of the present invention will be made clear from the description below with reference to the accompanying drawings.

DETAILED DESCRIPTION OF THE PREFERRED EMBODIMENT

Figure 1:
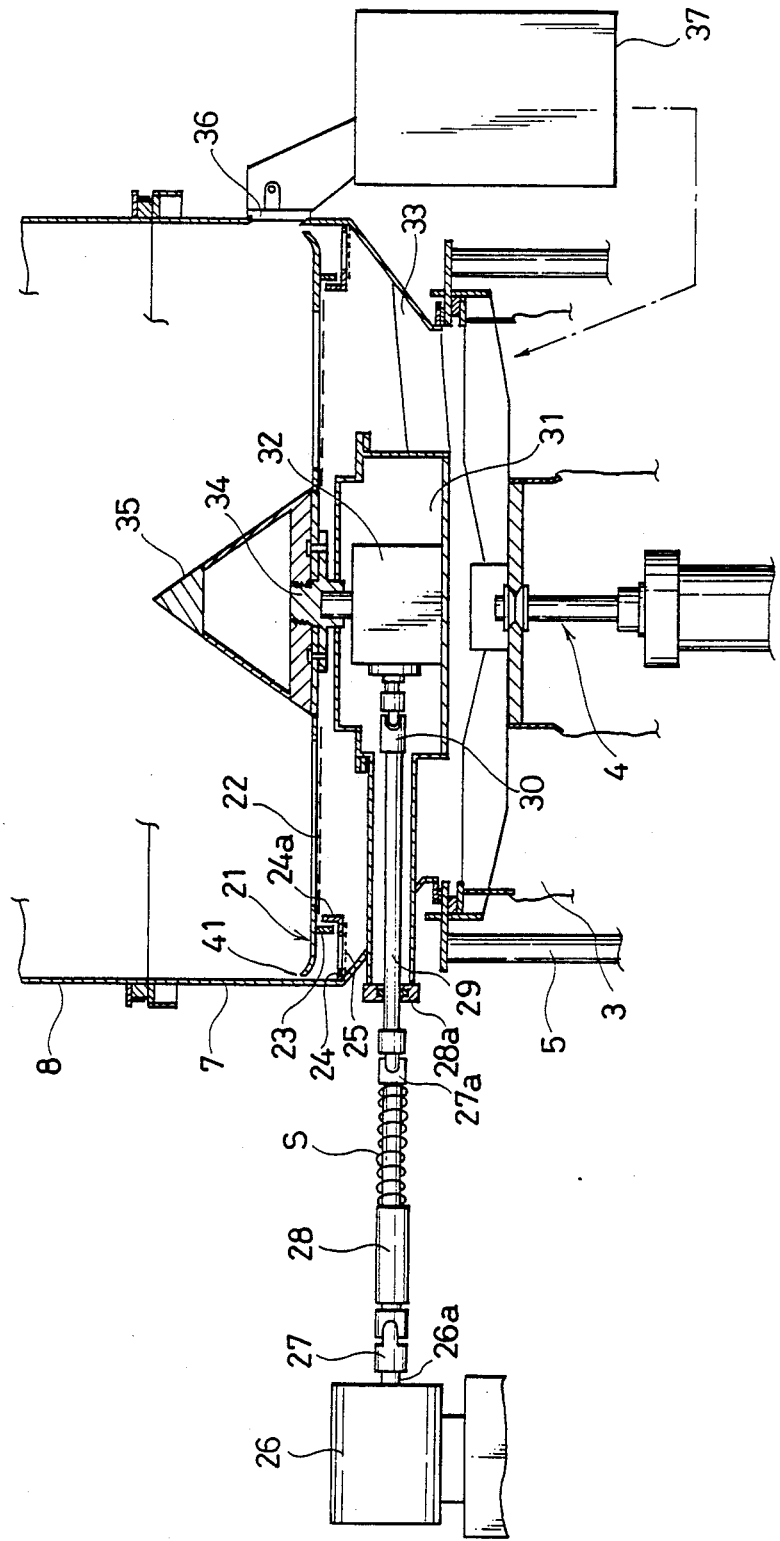
FIG. 1 is a sectional view of principal portion of the fluidized-bed granulating apparatus of an embodiment of the present invention.
Figure 3:
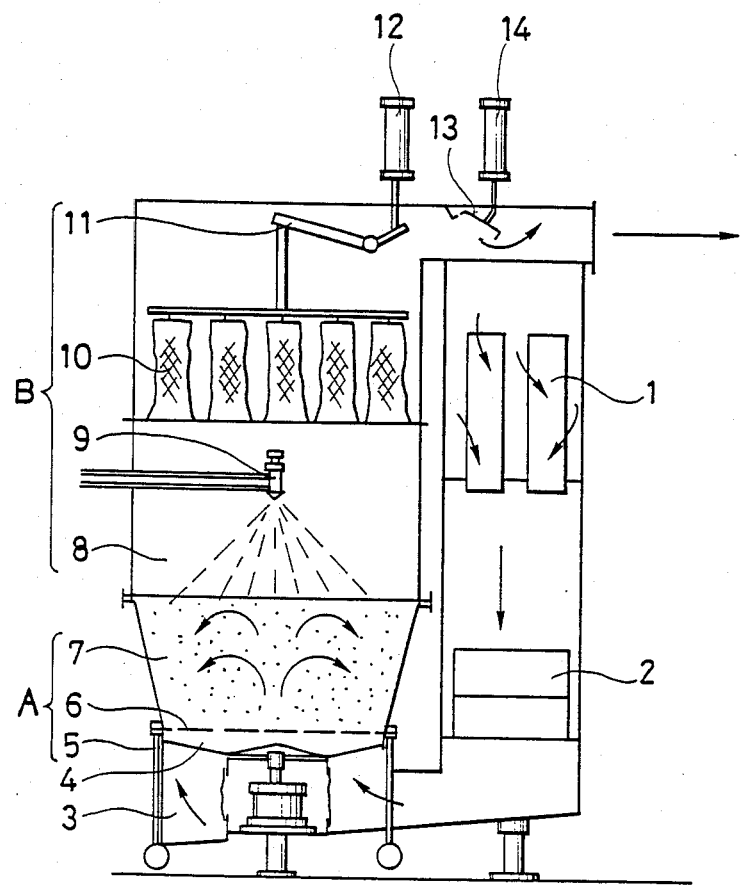
FIG. 3 is a schematic explanatory view of a conventional fluidized-bed granulating apparatus.

Referring now to the drawings, especially FIG. 1, the fluidized-bed granulating apparatus of an embodiment of the present invention, which is partially illustrated in FIG. 1, for example, comprises a removable portion which can be interchanged with a portion A under the container 7 of the apparatus shown in FIG. 3. Therefore, a portion B above the container of the apparatus shown in FIG. 3, i.e. the body of the fluidized-bed granulating apparatus, can be used in common with the embodiment of the present invention and the components in the portion B in this embodiment are therefore denoted by the same reference numerals and their detailed description is omitted.

As shown in FIG. 1, the container 7 of this embodiment comprises a conical lower portion and a cylindrical upper portion, and a rotor 21 on which powdered or granular raw materials are granulated by centrifugal tumbling and fluidization is provided in the container 7. A discharge valve 36 is provided in the side wall of the container 7 at the height at which the rotor 21 is provided. The container 7, together with the rotor 21, can be attached to and separated from the lower portion of the spraying chamber 8 which comprises the body of the fluidized-bed granulating apparatus. A reduction gear box 31, which is supported by a rib 33 from the peripheral wall and in which a reduction worm gear is disposed, is provided under the container 7. The rotor 21 and a center cone 35 are mounted on a vertical output shaft of the reduction gear 32 via a boss 34.

Part of the rotor 21 consists of an annular ventilating portion 22. Under a slit 41 between the inner wall of the container 7 and the periphery of the rotor 21, are provided means such as a ring 24, positioned under the rotor, in which a peripheral air passage is formed and a wire mesh 25 (air-permeable sealing means), positioned under this ring 24, for preventing materials from falling down. This wire mesh 25 forms a labyrinth structure with a labyrinth member 23 partitioning the space between the rotor 21 and the wire mesh 25. In other words, a vertical wall portion 24a which is bent so as to extend upward is formed around the inner periphery of the ring 24, and the labyrinth member 23 extends in an annular form downward from the lower surface of the rotor 21 so as to form a labyrinth structure between the vertical wall portion 24a and the labyrinth member 23.

The rotor 21 is driven by an electric motor 26. The rotor-driving force of the electric motor 26 is transmitted from an output shaft 26a of the electric motor 26 to the reduction gear 32 through a universal joint 27, a spline joint 28, a universal joint 27a, a transmission shaft 29, and a universal joint 30. A spring S is provided to prevent the universal joint 27a and the transmission shaft 29 from separating from an insert portion. Reference numeral 28a denotes a bearing for rotatably supporting the transmission shaft 29.

A description will now be made of a fluidized-bed granulating method in accordance with the present invention.

When raw materials are charged into the apparatus, the universal joint 27a and the transmission shaft 29 are first separated from the joint portion, then the lift-up device 4 is lowered so that the container 7 is loaded onto the wagon 5 and is removed from the chamber 8. In this state, since the upper portion of the container 7 is open, raw materials are charged from the upper portion of the container 7. The container 7 into which the raw materials have been charged is moved to a certain position of the chamber 8 by the wagon 5 and is set in the chamber 8 by the raising of the lift-up device 4, and then, the universal joint 27a and the transmission shaft 29 are then connected. Although raw materials fall onto the wire mesh 25 from the slit 41 during this operation, they do not fall through the wire mesh 25 because of the labyrinth structure 23. After the setting of the container 7 has been completed, ventilation is started so that the raw materials on the wire mesh 25 are blown up above the rotor 21 by hot air through the slit 41.

The rotation of the rotor 21 is then started and the granulating operations are performed in the ordinary manner. During operation, the damper 13 is fully closed for about 5 seconds every 60 to 120 seconds to stop the ventilation in order to facilitate the shaking down of dust adhering to the bag filters 10, and the fluidization of the materials on the rotor 21 is thus stopped. Since the rotor 21 continues to rotate, however, the materials are still subjected to the intensive tumbling action of the rotor 21. During this time, part of the materials falls onto the wire mesh 25 through the slit 41, but it is blown back above the rotor when ventilation starts again.

These granulating operations are repeated for a certain time, then the materials are discharged by opening an discharge valve 36 after final drying is completed. Since this apparatus is ventilated during the discharge, almost all of the granulated products which have fallen on the wire mesh 25 are discharged.

It was confirmed that according to this embodiment, granulated products comprising granules having sizes within the range of 32 to 80 mesh, bulk density of which is about 20% greater than that of the granulated products obtained by a conventional fluidized-bed granulating apparatus under the same conditions and about 10% greater than that of granulated products obtained by a fluidized-bed granulating apparatus having a rotor and bag filters divided into two chambers and operating in an ordinary ventilation manner had been obtained.

In addition, according to this embodiment, spherical and hard product having high bulk density have been obtained by increasing the water content within a range in which operation is possible, because few lumps are produced even if the water content of the materials is increased during the granulation. At the same time, it is possible to obtain granulated products of any desired bulk density by controlling the rotation speed of the rotor 21, the intervals between stops of ventilation, and the time during which ventilation is stopped.

It has been recognized from experiments performed by the inventors that, although the granulated products are powdered during the final drying to a degree greater than that of other methods, this powdering can be prevented by decreasing the rotation speed of the rotor 21 during the final drying.

It is apparent that the apparatus according to this embodiment is more durable than an apparatus in which the rotor 21 is repeatedly stopped and started at short intervals. In addition, the shaking process of the bag filters 10 in the above-described conventional method comprises the steps of stopping the spray, stopping or decreasing the speed of the rotor 21, fully closing the damper 13, shaking the bug filters 10, fully opening the damper 13, starting or increasing the speed of the rotor 21, and starting the spray, whereas that in this embodiment comprises the steps of stopping the spray, fully closing the damper 13, shaking the bag filters 10, fully opening the damper 13, and starting the spray. The time during which the spray is stopped can thus be reduced, resulting in a reduction of the total time taken for the granulation.

In addition, in this embodiment, if the discharge valve 36 is connected with a sealed vessel 37 at a negative pressure which is the same as that in the container 7, the granulated products in the container 7 can be easily and securely discharged therefrom by the rotation of the rotor 21 in cooperation with the ventilation from the lower portion of the container 7.

Figure 2:
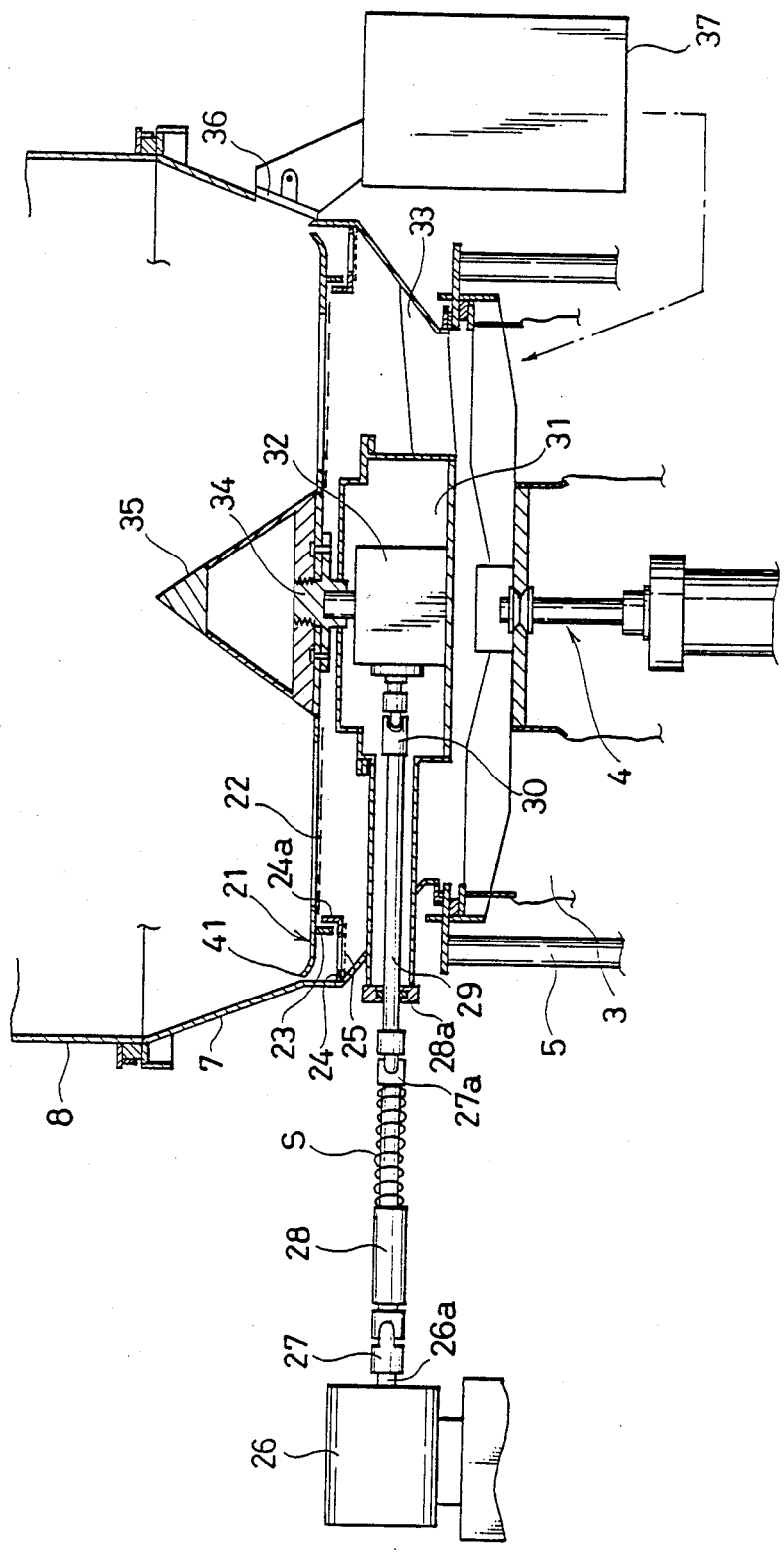
FIG. 2 is a sectional view of principal portion of another embodiment of the present invention.

FIG. 2 is a sectional view of principal portion of another embodiment of the present invention. In this embodiment, the container 7 is formed into a tapered shape, being expanded upwardly at a position near the outside of the rotor 21. Such a construction is also included in the present invention.

The present invention is not limited to the above-described embodiments and may be widely applied to other embodiments in which powder adhering to the bag filters are removed by pulse jet.

Further, in the transmission system connecting the driving motor 26 and the rotor 21, a joint means such as a detachable universal joint or a coupling may be utilized to joint the reduction gear 32 and the rotor 21 in transmittable manner, in addition to the universal joint 27a.

The present invention can provide the excellent effects described below.

Since the fluidized-bed granulating apparatus comprises a chamber, a container removably provided under the chamber, a rotor rotating in the container, a rotor-driving means, a gas-introducing means for introducing a gas into the container through a circular slit between the inner wall of the container and the periphery of the rotor, an air-permeable sealing means provided under the circular slit, a labyrinth means for partitioning the space between the air-permeable sealing means and the rotor, and a product discharging means for discharging products from the container, it is possible to obtain spherical and hard product having high bulk density by simply changing the container and the rotor of a conventional granulating apparatus.

In addition, when substances are granulated by a process wherein a gas is supplied to the container from the lower portion thereof and the powder is tumbled and fluidized on the rotor rotating in the container, necessary operations can be performed in a state wherein the spray is stopped and the damper is fully closed while the rotor is still rotating, then the damper is fully opened and the spray is started, so that highly-efficient granulation can be performed in a short time.

What is claimed is:

1. A fluidized-bed granulating apparatus comprising a chamber having a spraying means and an exhaust damper, a container removable provided under said chamber, a rotor mounted for rotation in said chamber, a rotor-driving means, a gas-introducing means for introducing gas into said container through a circular slit between an inner wall of said container and said rotor's periphery, an air-permeable sealing means provided under said circular slit, a labyrinth means for partitioning a space between said air-permeable sealing means and said rotor, and a product discharging means for discharging product from said container wherein said air-permeable sealing means comprises a ring member having a vent opening provided under said circular slit and an air permeable means provided under said ring member to prevent powdered or granular material from falling.

2. A fluidized-bed granulating apparatus according to claim 1, wherein said rotor, together with said container, can be attached to and separated from said chamber of said fluidized-bed granulating apparatus.

3. A fluidized-bed granulating apparatus according to claim 1, wherein said product-discharging means communicates with a sealed discharging vessel that is kept at a negative pressure which is substantially the same as that in a processing chamber of said container.

4. A fluidized-bed granulating apparatus according to claim 1, wherein said rotor-driving means comprises a motor provided outside of said container, a transmission shaft connecting an output shaft of said motor and said rotor in transmittable manner, and a joint means jointing detachably between said motor and said rotor.

5. A fluidized-bed granulating apparatus according to claim 4, wherein said joint means is a universal joint and/or a coupling, said universal joint and/or coupling is incorporated into and removed from said rotor-driving means between said motor and said rotor at the time when said container is attached to and separated from the chamber of said granulating apparatus.

6. A fluidized-bed granulating apparatus according to claim 1, wherein said container and said rotor are supported on a horizontally movable wagon so that they can be moved into said chamber of said granulating apparatus and are vertically and movably supported by a lift-up device.

7. A fluidized-bed granulating apparatus according to claim 1, further comprising a vertical wall portion which is bent upward is provided around the inner periphery of said ring member and said labyrinth means comprises a labyrinth member which extends downward from the lower surface of said rotor in an annular form so as to form a labyrinth structure between said vertical wall portion of said ring member and said labyrinth means.

8. A method of granulating substances in an apparatus of the type comprising a chamber having a spraying means and an exhaust damper, a container removably provided under said chamber, a rotor mounted for rotation in said chamber, a rotor-driving means, a gas-introducing means for introducing gas into said container through a circular slit between an inner wall of said container and said rotor's periphery, an air-permeable sealing means provided under said circular slit, a labyrinth means for partitioning a space air-permeable sealing means and said rotor, and a product discharging means for discharging product from said container wherein said air-permeable sealing means comprises a ring member having a vent opening provided under said circular slit and an air permeable means provided under said ring member to prevent powdered or granular material from falling; said method comprising the steps of:

charging said substance into said container;
rotating said rotor while operating said spraying means;
stopping said spraying means while continuing to rotate said rotor with said damper fully closed; and
opening said damper and starting said spraying means.

* * * * *

UNITED STATES PATENT AND TRADEMARK OFFICE
CERTIFICATE OF CORRECTION

PATENT NO. : 4,834,299

DATED : May 30, 1989

INVENTOR(S) : Kazuo Kishibata et al

It is certified that error appears in the above-identified patent and that said Letters Patent is hereby corrected as shown below:

On the title page correct first Assignee's name to read

-- Kabushiki Kaisha Okawara Seisakusho --.

Signed and Sealed this

Thirteenth Day of March, 1990

*Attest:*

JEFFREY M. SAMUELS

*Attesting Officer*   *Acting Commissioner of Patents and Trademarks*